(12) United States Patent
Flores-Lira et al.

(10) Patent No.: US 7,309,478 B2
(45) Date of Patent: Dec. 18, 2007

(54) PRODUCTION OF TETRABASIC LEAD SULFATE FROM SOLID STATE REACTIONS FOR THE PREPARATION OF ACTIVE PLATES TO BE USED IN LEAD-ACID BATTERIES

(75) Inventors: Ricardo Flores-Lira, Monterrey (MX); Sanjuana Garza-de La Garza, Monterrey (MX)

(73) Assignee: GES Technologies IP GmbH, Basel (CH)

( * ) Notice: Subject to any disclaimer, the term of this patent is extended or adjusted under 35 U.S.C. 154(b) by 0 days.

(21) Appl. No.: 11/296,130

(22) Filed: Dec. 7, 2005

(65) Prior Publication Data

US 2006/0088465 A1    Apr. 27, 2006

Related U.S. Application Data

(62) Division of application No. 10/803,491, filed on Mar. 19, 2004, now Pat. No. 7,011,805.

(51) Int. Cl.
*C01G 21/00*    (2006.01)
*H01M 4/16*    (2006.01)
*H01M 4/56*    (2006.01)
*H01M 10/12*    (2006.01)

(52) U.S. Cl. ............... 423/559; 429/227; 429/228; 29/623.1; 29/623.5

(58) Field of Classification Search ............... 423/559; 429/227, 228; 29/623.5, 623.1
See application file for complete search history.

(56) References Cited

U.S. PATENT DOCUMENTS

| | | |
|---|---|---|
| 1,572,586 A | 2/1926 | Weir |
| 2,159,226 A | 5/1939 | Reid |
| 2,165,944 A | 7/1939 | Scott |
| 2,182,479 A | 12/1939 | Johnstone |
| 2,717,903 A | 9/1955 | Ruth |
| 3,001,013 A | 9/1961 | Stanton |
| 3,104,946 A | 9/1963 | Veal |
| 3,169,890 A | 2/1965 | Voss et al. |
| 3,173,810 A * | 3/1965 | Voss et al. ............... 429/227 |
| 3,186,871 A | 6/1965 | Donohue |
| 3,194,685 A | 7/1965 | Malloy |
| 3,252,764 A | 5/1966 | Bruno, Jr. |
| 3,384,458 A | 5/1968 | McCarthy et al. |
| 3,398,024 A | 8/1968 | Barnes et al. |
| 3,419,431 A | 12/1968 | Michaels |
| 3,449,166 A | 6/1969 | Jache |
| 3,480,478 A | 11/1969 | Sohn et al. |
| 3,702,265 A | 11/1972 | Snyder et al. |
| 3,734,694 A | 5/1973 | McCoy |
| 3,747,560 A | 7/1973 | Roberts et al. |
| 3,765,943 A | 10/1973 | Biagetti |
| 3,770,507 A | 11/1973 | Weissman et al. |
| 3,887,693 A | 6/1975 | Escribano Nevado et al. |
| 3,894,886 A | 7/1975 | Pankow et al. |
| 3,899,349 A | 8/1975 | Yarnell |
| 3,942,433 A | 3/1976 | Wohlfarter |
| 3,951,688 A | 4/1976 | Pankow et al. |
| 3,974,026 A | 8/1976 | Emson et al. |
| 4,019,431 A | 4/1977 | Bastgen |
| 4,020,882 A | 5/1977 | Foulkes |
| 4,024,055 A | 5/1977 | Blann |
| 4,050,482 A | 9/1977 | Ching et al. |
| 4,064,725 A | 12/1977 | Hug et al. |
| 4,110,519 A | 8/1978 | Nilsson |
| 4,140,589 A | 2/1979 | Hradcovsky et al. |
| 4,143,218 A | 3/1979 | Adams et al. |
| 4,212,179 A | 7/1980 | Juergens |
| 4,232,100 A | 11/1980 | Magnusson et al. |
| 4,315,829 A | 2/1982 | Duddy et al. |
| 4,323,470 A | 4/1982 | Mahato et al. |
| 4,324,768 A | 4/1982 | Sugahara et al. |
| 4,326,017 A | 4/1982 | Will |
| 4,336,236 A | 6/1982 | Kolakowski et al. |
| 4,346,022 A | 8/1982 | Wolcott et al. |
| 4,346,151 A | 8/1982 | Uba et al. |
| 4,383,011 A | 5/1983 | McClelland et al. |

(Continued)

FOREIGN PATENT DOCUMENTS

| | | |
|---|---|---|
| EP | 196507 | 10/1986 |
| EP | 0 540 229 A1 | 5/1993 |
| EP | 0707718 | 4/1996 |
| ES | 8801559 | 4/1988 |
| FR | 723018 | 4/1932 |
| GB | 1014694 | 12/1965 |
| JP | 58-147961 | 9/1983 |
| JP | 59-101773 | 6/1984 |
| JP | 63-269456 | 11/1988 |
| WO | WO 8200258 A1 | 2/1982 |
| WO | WO 02/069418 A1 | 9/2002 |

OTHER PUBLICATIONS

The abstract of the reference titled "The influence of lead oxide modification on the kinetics of the lead oxide-lead sulfate (4PbO.PbSO4) lead-acid battery paste formation" by V. Ilieve et al. published in Journal of Applied Electrochemistry, 9(5), 555-562, (English) 1979.*

(Continued)

*Primary Examiner*—Timothy C. Vanoy
(74) *Attorney, Agent, or Firm*—Foley & Lardner LLP

(57) ABSTRACT

A solid state reaction method for the production of tetrabasic lead sulfate includes the steps of mixing a stoichiometric mixture of 3PbO.PbSO4.H2O and PbO and heating the stoichiometric mixture of 3PbO.PbSO4.H2O and PbO at a temperature between 500 and 700° C. for 3 to 8 hours. The method also includes the steps of deagglomerating and sieving resulting tetrabasic lead sulfate.

20 Claims, 2 Drawing Sheets

U.S. PATENT DOCUMENTS

| | | | |
|---|---|---|---|
| 4,387,142 A | 6/1983 | Lindholm et al. |
| 4,388,210 A | 6/1983 | Parker |
| 4,407,911 A | 10/1983 | Hooke |
| 4,414,295 A | 11/1983 | Uba |
| 4,415,410 A | 11/1983 | Reich |
| 4,421,832 A | 12/1983 | Uba |
| 4,422,917 A | 12/1983 | Hayfield |
| 4,475,453 A | 10/1984 | Davis |
| 4,501,669 A | 2/1985 | Hakansson et al. |
| 4,547,443 A | 10/1985 | Rowlette et al. |
| 4,551,401 A | 11/1985 | Wilson |
| 4,606,982 A | 8/1986 | Nelson et al. |
| 4,618,478 A | 10/1986 | McKinney |
| 4,637,966 A | 1/1987 | Uba et al. |
| 4,648,177 A | 3/1987 | Uba et al. |
| 4,656,706 A | 4/1987 | Mahato et al. |
| 4,697,511 A | 10/1987 | Davis et al. |
| 4,705,602 A | 11/1987 | Dahl |
| 4,707,272 A | 11/1987 | Kistler |
| 4,758,372 A | 7/1988 | Eirich et al. |
| 4,780,379 A | 10/1988 | Puester |
| 4,867,886 A | 9/1989 | Botkins, Jr. |
| 4,900,643 A | 2/1990 | Eskra et al. |
| 4,902,532 A | 2/1990 | Seo |
| 5,002,700 A | 3/1991 | Otagawa et al. |
| 5,021,166 A | 6/1991 | Torpey |
| 5,045,086 A | 9/1991 | Juergens |
| 5,047,300 A | 9/1991 | Juergens |
| 5,091,273 A | 2/1992 | Hug et al. |
| 5,092,404 A | 3/1992 | Falsk et al. |
| 5,096,611 A | 3/1992 | Matthew et al. |
| 5,120,620 A | 6/1992 | Nelson et al. |
| 5,198,313 A | 3/1993 | Juergens |
| 5,252,105 A | 10/1993 | Witherspoon et al. |
| 5,273,554 A | 12/1993 | Vyas |
| 5,290,359 A | 3/1994 | Coonen et al. |
| 5,302,476 A | 4/1994 | Kao et al. |
| 5,368,961 A | 11/1994 | Juergens |
| 5,382,482 A | 1/1995 | Suga et al. |
| 5,443,601 A | 8/1995 | Doeff et al. |
| 5,447,809 A | 9/1995 | Hafner et al. |
| 5,660,600 A | 8/1997 | Vyas |
| 5,871,862 A | 2/1999 | Olson |
| 5,958,621 A | 9/1999 | Kao |
| 5,998,062 A | 12/1999 | Olson |
| 6,014,798 A | 1/2000 | Nitsche et al. |
| 6,168,661 B1 | 1/2001 | Dinkelman |
| 6,274,274 B1 | 8/2001 | Schaeffer et al. |
| 6,442,811 B1 | 9/2002 | Dawood et al. |
| 6,454,977 B1 | 9/2002 | Kwok et al. |
| 6,755,874 B2 | 6/2004 | Chen et al. |
| 2002/0124388 A1 | 9/2002 | Chen et al. |
| 2004/0121233 A1 | 6/2004 | Klein et al. |
| 2004/0234852 A1 | 11/2004 | Klein et al. |
| 2005/0207969 A1 | 9/2005 | Flores-Lira et al. |

OTHER PUBLICATIONS

V. Iliev et al. "The influence of PbO modification on the kinetics of the 4PbO.PbSO4 lead-acid battery paste information" J of Applied Electrochemistry, vol. 9 (1979) pp. 555-562.*

Grugeon-DeWaele, S.; Laruelle, S.; Joliveau-Vallat, F.; Torcheux, L.; Delahaye-Vidal, A.; "Synthesis and electrochemical performances of tribasic and tetrabasic lead sulfates prepared by reactive grinding"; Journal of Power Sources; vol. 72 (1998); pp. 126-131.

Search Report by European Patent Office for International Application No. PCT/IB2005/002373; date of mailing Oct. 24, 2005.

Grugeon-DeWaele, S., Laruelle, S.. Joliveau-Vallat, F., Torcheux, DeLahaye-Vidal, A., "Synthesis and Electrochemical Performances of Tribasic and Tetrabasic Lead Sulfates Prepared by Reactive Grinding", Journal of Power Sources 72, 1998, pp. 126-131.

Vilhunen, J.K., Hornytzkyj, S. and Tummavuori, J. "The Influence of the Raw Material and Production Method on the Morphology, Microstructure, Chemical and Phase Composition of Tetrabasic Lead Sulfate Pastes", Journal of Power Sources, vol. 39, 1992, pp. 59-65.

Pavlov, D. and Kapkov, N., "Lead-Acid Battery Pastes Containing $4PbO-PbSO_4$ and $Pb_3O_4$", J. Electrochemical Society, vol. 137, No. 1, Jan. 1990, pp. 16-28.

Yarnell, C.F. and Weeks, M.C., "The Oxidation of Tetrabasic Lead Sulfate to Lead Dioxide in the Positive Plate of the Lead-Acid Battery", Journal of the Electrochemical Society, Jan. 1979, vol. 126, No. 1, pp. 7-11.

McCabe, W.L. and Smith, J.C., "Unit Operations of Chemical Engineering" third edition, McGraw-Hill Book Company, 1976, 5 pages.

Pavlov, D. and Papazov, G., "Dependence of the Properties of the Lead-Acid Battery Positive Plate Paste on the Processes Occurring During Its Production" Journal of the Applied Electrochemistry, vol. 6, No. 4, Jil. 1976, pp. 339-345.

Biagetti, R.V. and Weeks, M.C., "Tetrabasic Lead Sulfate as a Paste Material for Positive Plates", Bell System Technical Journal, Sep. 1970, vol. 49, No. 7, pp. 1305-1319.

Burbank, J., "Anodic Oxidation of the Basic Sulfates of Lead" Journal of the Electrochemical Society, vol. 113, No. 1, Jan. 1966, pp. 10-14.

* cited by examiner

PRODUCTION OF TETRABASIC LEAD SULFATE FROM SOLID STATE REACTIONS FOR THE PREPARATION OF ACTIVE PLATES TO BE USED IN LEAD-ACID BATTERIES

CROSS-REFERENCE TO RELATED PATENT APPLICATIONS

This application is a divisional application under 35 U.S.C. § 121 of U.S. patent application Ser. No. 10/803,491 filed Mar. 19, 2004 now U.S. Pat. No. 7,011,805. The entire disclosure of U.S. patent application Ser. No. 10/803,491 is incorporated by reference herein.

BACKGROUND

This invention relates generally to the production of tetrabasic lead sulfate and more specifically to the production of tetrabasic lead sulfate from solid state reactions for the preparation of active plates to be used in lead-acid batteries.

The preparation of active electrodes or plates for lead-acid batteries involves three steps: a) paste application to a supporting grid, b) drying and curing of the pasted grid, and c) electrochemical formation of the cured grid to produce the active materials used in the charged lead-acid battery. Battery formation is usually carried out by passing current through the electrode, which results in a positive plate having pellets of lead dioxide, and a negative plate having pellets of metallic lead. Tetrabasic lead sulfate, $4PbO.PbSO_4$, is a very useful starting material for the preparation of positive electrodes for lead-acid batteries. According to U.S. Pat. No. 3,765,943 and U.S. Pat. No. 3,899,349, battery plates or electrodes fabricated with this sulfate and cured in the presence of a controlled amount of carbon dioxide gas, are associated with an increased product yield, greater life, greater reproducibility in the chemical and physical properties of the product, and crystal morphology more suitable for battery operation. Although both positive and negative electrodes may be formed with tetrabasic lead sulfate, this material is preferably used for positive plates. See also Pavlov, D. and Papazov, G., Journal of Applied Electrochemistry 6, 1976, pp. 339-345, as well as Pavlov, D. and Kapkov, N.J., Electorchemical Society 137(1), 1990, pp. 16-28.

In the manufacturing process of lead-acid batteries, tetrabasic lead sulfate is usually produced by mixing the required amounts of leady oxide ($\alpha$ and $\beta$-PbO with free lead), sulfuric acid and water. Although this procedure seems to be very straightforward, several important variations of it have been reported, mainly in the patent literature.

For instance, U.S. Pat. No. 3,765,943 discloses a process for fabrication of positive electrodes for lead-acid batteries wherein the electrodes are fabricated from grids filled with paste and including the steps of reacting orthorhombic lead oxide in an aqueous suspension with sulfuric acid at 80-100° C. to produce tetrabasic lead sulfate. The lead-containing material contains at least 90 wt % of lead oxide, the aqueous suspension in which the reaction takes place is preacidified to a pH range of 1-3.5 prior to the addition of lead oxide and the tetrabasic lead sulfate is separated from the aqueous suspension within one hour after complete addition of the sulfuric acid.

U.S. Pat. No. 4,324,768 discloses a process for the preparation of water insoluble lead compounds having a composition represented by the general formula $nPbO.PbX_2$, wherein X stands for an inorganic acid radical, x indicates the valency of the radical X and n is a number of from 0 to 5, which comprises reacting lead monoxide according to the wet method with an inorganic acid or organic acid in the presence of hydroxylamine under such conditions that the initial pH value of the reaction system is not higher than 7. The lead compound represented by the general formula may be an ortho-salt such as lead chromate or a basic salt such as tetrabasic lead sulfate ($4PbO.PbSO_4$). Further, it may be a salt containing at least two acid radicals, such as lead silicosulfate.

U.S. Pat. No. 5,096,611 discloses a process for making a battery paste comprising an initial step of forming a paste mixture by reacting a lead oxide having a low free lead content with sulfuric acid in an aqueous slurry, followed by dewatering of the partially reacted slurry to obtain the paste material. In one described embodiment, a slurry containing one or more basic lead sulfates suitable for use as the active material in lead-acid battery electrodes is formed in a continuously stirred tank reactor. The slurry is withdrawn from the reactor and fed to a belt press, which reduces the moisture content of the slurry to the desired level. Battery pastes produced according to that invention may be fed continuously to a paster for mass production of positive and negative battery plates from grids. This process can utilize a variety of lead oxides including Barton, leady and nonleady oxides of any crystal structure, and can produce a paste containing either tribasic lead sulfate, tetrabasic lead sulfate, or a mixture thereof at a specified ratio. The amount of tetrabasic lead sulfate in the battery paste is determined during paste formation, and no subsequent adjustment is needed. Free lead can be removed or oxidized and the curing step is eliminated from the lead-acid battery manufacturing process. U.S. Pat. No. 5,290,359 discloses an apparatus for making a battery paste following the process disclosed in U.S. Pat. No. 5,096,611.

U.S. Pat. No. 5,252,105 discloses a continuous process in which an electrode for a lead-acid battery is prepared without the conventional curing step. The general procedure for preparing electrodes includes preparing a paste mixture comprising an active material precursor, sulfate-containing acids, and an inhibitor. The active material precursor includes lead oxides having at least 10% by weight lead oxide in the form of $Pb_3O_4$ (red lead), and a BET surface area of at least about 0.8 $m^2/g$; desirably about 1.00 to 1.50 $m^2$/grain and preferably about 1.0 to 1.25 $m^2/g$. The inhibitor (preferably a simple sugar or a related compound having at least one hydroxyl group per carbon atom) prevents formation of tribasic lead sulfate and tetrabasic lead sulfate from the precursor material and sulfate-containing acids, except at elevated temperatures (tetrabasic lead sulfate forms with further processing at temperatures typically in excess of 80° C.). The paste is applied to electrode grids and reacted at elevated temperatures for between about 5 and about 30 minutes, to form the active material of the electrode for both positive and negative electrodes. Plates are then assembled into batteries and charged. Negative electrodes differ from the positive, mainly in the additives used.

U.S. Pat. No. 5,273,554 discloses a process for fabricating a battery in which tetrabasic lead sulfate is produced by reacting lead oxide with a substantial excess of a sulfate reactant at a pH in the range of 9.3 to 12. The resulting materials provide needle-like structures with a width generally in the range of 3 to 1 μm. The relative narrow needles, when employed on the positive electrode of a lead acid battery, improve the efficiency of formation, provide good adhesive to the positive plate, extend battery life, as well as, yield excellent capacity per gram of active material. In one embodiment, a precursor is prepared by reacting lead oxide with sulfuric acid in the presence of an excess of sulfate to form a paste and applying the paste to a grid with subsequent curing. Control of the temperature below 60° C. in the reaction medium and of the sulfate excess yields, after curing at a temperature above 70° C. and 100% humidity, a positive plate having an extremely uniform prismatic size, tetrabasic lead sulfate and a uniform pore distribution. Most significantly, the width of these crystals is extremely narrow—having an average dimension in the range of 1 to 2 μm—allowing rapid conversion to lead oxide from the precursor and further providing enhanced adhesion and current capacity attributes. Thus, the lead oxide obtained after conversion has prismatic crystals with an average crystal width less than 2.5 μm. In a second embodiment, tetrabasic lead sulfate of relative small prismatic size is achieved by just reacting lead oxide with sulfuric acid in a stirred aqueous solution containing excess sulfate at temperatures above 60° C. to immediately form tetrabasic lead sulfate. The tetrabasic lead sulfate is mixed with water to form a paste. Positive plates made by applying this paste to a lead grid and converted to lead oxide, also have higher current capacity attributes. U.S. Pat. No. 5,660,600 refers to the batteries fabricated according to the process disclosed in U.S. Pat. No. 5,273,554, as well as to the materials useful therein.

U.S. Pat. No. 6,454,977 discloses a continuous paste making process for lead-acid batteries that includes the steps of mixing water with a lead oxide, reacting an acid (usually sulfuric acid) with the lead oxide in a mixture to produce lead oxide-lead sulfate compounds, and forming a paste comprising interlocking basic lead sulfate complex crystals from the lead lead-oxide sulfate compounds, where the mixing, reacting, and crystal forming steps occur in an extrusion or in a high-shear continuous processing apparatus. The method also includes the step of extruding the paste from the extrusion apparatus into a grid mesh where the paste is dried to form a battery plate of the lead-acid battery.

Evidently, tetrabasic lead-sulfate is an essential raw material for the lead-acid battery industry. Surprisingly, only a few synthesis methods, other than the ones mentioned above, have been reported in the scientific literature for the production of tetrabasic lead sulfate.

For instance, Burbank J., Journal of The Electrochemical Society 113(1), 1966, pp. 10-14, describes a method for the preparation of monobasic, tribasic and tetrabasic lead sulfates by reacting PbO and dilute sulfuric acid. The crystalline phases were identified by x-ray diffraction, and electron microscope examination showed all three to consist of prismatic needles. The three basic sulfates were pressed into pellets and oxidized anodically in a frame of pure lead and in 1.050 specific gravity sulfuric acid X-ray diffraction showed that each transformed to alpha lead dioxide. $PbO_2$ formed from pellets made from tetrabasic lead sulfate were mechanically strong formed by the interlocking of large crystals.

Vilhunen, Journal of Power Sources 39, 1992, pp. 59, evaluated the differences arising on the positive active material with high tetrabasic lead sulfate content due to preparation technique or starting material. Wet chemical analysis, X-ray diffraction, transmission and scanning electron microscopy methods were used to characterize the materials. The tetrabasic lead sulfate was made from leady oxide and tetragonal PbO by solution or paste methods. The paste yielded smaller crystals which were also more irregular than the large single crystal-like particles resulting from the solution process. These results provide choices for achieving the crystal structure in conditional plates most conducive to long cycle life.

Lastly, Grugeondewaele et al., Journal of Power Sources 72(2), 1998, pp. 126-131, prepared tribasic lead sulfate and tetrabasic lead sulfate by reactive grinding. The effects of various experimental parameters (stoichiometry, hygrometry of the starting compounds, duration of mechanical treatment) upon the nature and morphological features of the resulting phase were investigated. With water in excess, only tribasic lead sulfate was produced while dry reagents led to tetrabasic lead sulfate. In both case, samples with a small particle size and high reactivity were obtained. In order to evaluate the influence of the morphology upon the electrochemical performances of such grinding produced samples, the capacity was measured and compared with that of traditional tribasic lead sulfate and tetrabasic lead-sulfate samples.

In brief, the available methods for the production of tetrabase lead sulfate are complex, costly or yield heterogeneous crystal sizes.

SUMMARY

An exemplary embodiment of the present invention relates to a solid state reaction method for the production of tetrabasic lead sulfate. The method includes the steps of mixing a stoichiometric mixture of $3PbO.PbSO4$—$H2O$ and PbO and heating the stoichiometric mixture of $3PbO.PbSO4.H2O$ and PbO at a temperature between 500 and 700° C. for 3 to 8 hours. The method also includes the steps of deagglomerating and sieving resulting tetrabasic lead sulfate.

Another exemplary embodiment of the present invention relates to a method of forming a battery plate that includes mixing a stoichiometric mixture of $3PbO.PbSO4.H2O$ and PbO and heating the stoichiometric mixture of $3PbO.PbSO4.H2O$ and PbO at a temperature between 500 and 700° C. for 3 to 8 hours. The method also includes deagglomerating and sieving resulting tetrabasic lead sulfate. The method also includes forming a paste using the tetrabasic lead sulfate and providing the paste on a battery plate.

Another exemplary embodiment of the present invention relates to a method of producing a lead-acid battery that includes providing a battery comprising a plurality of battery plates, the battery plates prepared by a method comprising: mixing a stoichiometric mixture of $3PbO.PbSO4.H2O$ and PbO; heating the stoichiometric mixture of $3PbO.PbSO4.H2O$ and PbO at a temperature between 500 and 700° C. for 3 to 8 hours; and deagglomerating and sieving resulting tetrabasic lead sulfate. The method also includes forming a paste using the tetrabasic lead sulfate; and providing the paste on a battery plate.

DETAILED DESCRIPTION OF THE INVENTION

Figure 1:
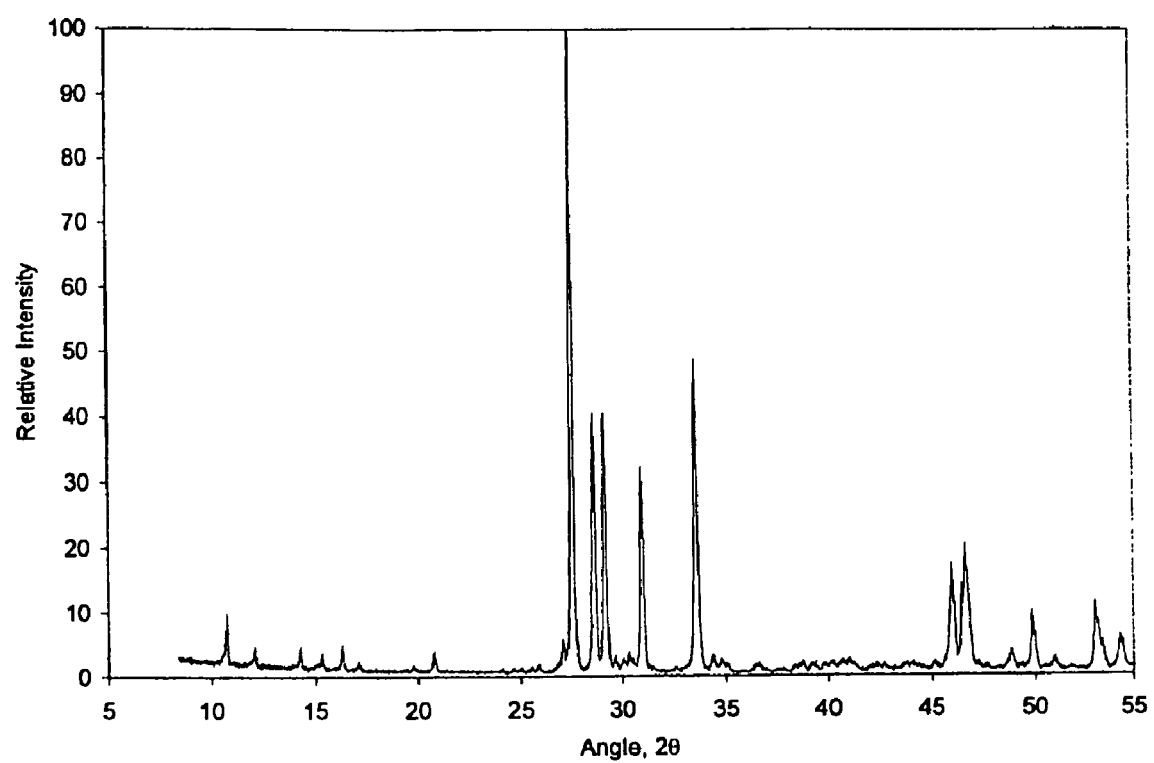
FIG. 1 shows a characteristic x-ray diffraction pattern for tetrabasic lead sulfate obtained by a solid state reaction according to the present invention.

The present invention relates to different methods used in the production of tetrabasic lead sulfate by means of solid state reactions at high temperatures, which allow forming powdered sulfate compounds having a particle size of less than 10 μm. According to the present invention, the following methods are employed to obtain the tetrabasic lead sulfate.

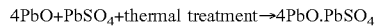

In this case, a solid state reaction method is proposed for the production of tetrabasic lad sulfate by reacting 4PbO and $PbSO_4$. This method comprising the steps of mixing of the stoichiometric mixture of 4PbO and $PbSO_4$, heating the stoichiometric mixture of 4PbO and $PbSO_4$ at a temperature between 500 and 700° C. during 3 to 8 hours and finally deagglomerating and sieving the resulting tetrabasic lead sulfate.

EXAMPLE 1

Five mole of lead oxide were intimately mixed up with four mole of lead sulfate. A heat treatment of the reacting mixture at 600° C. for 4 hours made it possible to achieve a degree of transformation of 95%.

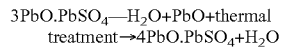

In this case a solid state reaction method is proposed for the production of tetrabasic lead sulfate by reacting $3PbO.PbSO_4.H_2O+PbO$. This method comprising the steps of mixing of the stoichrometric mixture of $3PbO.PbSO_4.H_2O+PbO$, heating the stoichiometric mixture of $3PbO.PbSO_4.H_2O+PbO$ at a temperature between 500 and 700° C. during 3 to 8 hours and finally deagglomerating and sieving the resulting tetrabasic lead sulfate.

EXAMPLE 2

A degree of transformation into tetrabasic lead sulfate of 83.4% was achieved by heat treating at 600° C. for 5 hours a mixture of one mole of tribasic lead sulfate with one mole of lead oxide.

An alternative method to this chemical route to produce tetrabasic lead sulfate is as follows:

Either by using active materials coming from the pastes used for the preparation of the lead-acid battery plates, or coming from recycled lead-acid battery plates. In this case, a solid state reaction method is proposed for the production of tetrabasic lead sulfate by reacting $3PbO.PbSO_4.H_2O+PbO$. This method comprises the steps of mixing either the paste used for the preparation of the lead-acid battery plates, or the paste recovered from recycled lead-acid battery plates, heating the mixture at a temperature between 500 and 700° C. during 3 to 8 hours, and finally deagglomerating and sieving the resulting tetrabasic lead sulfate.

EXAMPLE 3

A degree of transformation into tetrabasic lead sulfate of 93% was achieved by heat treating at 650° C. for 5 hours the active materials coming from recycled lead-acid battery plates.

$$5PbO+H_2SO_4+\text{thermal treatment} \rightarrow 4PbO.PbSO_4+H_2O$$

In this case a solid state reaction method is proposed for the production of tetrabasic lead sulfate by reacting $5PbO+H_2SO_4$. This method comprising the steps of missing the PbO with 1 mole of a $H_2SO_4$ aqueous solutions having a specific gravity in the range of 1.100 to 1.400 g/cm³, following this by a temperature rise of the stoichiometric mixture to 500-700° C., holding the mixture at that temperature for 3 to 8 hours, and finally deagglomerating and sieving the resulting tetrabasic lead sulfate.

EXAMPLE 4

A degree of transformation into tetrabasic lead sulfate of 72.9% was achieved by heat treating at 600° C. for 6 hours a mixture of 5 mole of PbO with 1 mole of a $H_2SO_4$ aqueous solution having a specific gravity of 1.150 g/cm³.

$$4PbO+PbCO_3+H_2SO_4+\text{thermal treatment} \rightarrow 4PbO.PbSO_4+CO_2+H_2O$$

In this case, a solid state reaction method is proposed for the production of tetrabasic lead sulfate by reacting $4PbO+PbCO_3+H_2SO_4$, comprising the steps of mixing a stoichiometric mixture of $4PbO+PbCO_3$, followed by the addition of 1 mole of a $H_2SO_4$, aqueous solution having a specific gravity in the range of 1.100 to 1.400 g/cm³, then heating the stoichiometric mixture of $4PbO+PbCO_3+H_2SO_4$ at a temperature between 500 and 700° C. for 3 to 8 hours, and finally deagglomerating and sieving the resulting tetrabasic lead sulfate.

EXAMPLE 5

A degree of transformation into tetrabasic lead sulfate of 86% was achieved by heat treating at 650° C. for 6 hours a mixture of 4 mole de PbO with 1 mol of $PbCO_3$ plus 1 mole of a $H_2SO_4$ aqueous solution having a specific gravity of 1.150 g/cm³.

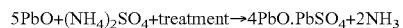

In this case, a solid state reaction method is proposed for the production of tetrabasic lead sulfate by reacting $5PbO+(NH_4)_2SO_4$, comprising the steps of mixing the stoichiometric mixture of $5PbO+(NH_4)_2SO_4$, then heating the stoichiometric mixture of $5PbO+(NH_4)_2SO_4$ at a temperature between 500 and 700° C. during 3 to 8 hours, and finally deagglomerating and sieving the resulting tetrabasic lead sulfate.

EXAMPLE 6

A degree of transformation into tetrabasic: lead sulfate of 80% was achieved by heat treating at 650° C. for 6 hours a mixture of 5 mole of PbO with 1 mol of $(NH_4)_2SO_4$.

The characteristic X-ray diffraction angles for the tetrabasis lead sulfate obtained according to the present invention are shown in the following table and the corresponding peak intensities are indicated in FIG. 1.

| X-Ray Diffraction Angle | Corresponding Phase (4BS = tetrabasic lead sulfate) |
|---|---|
| 10.70 | 4BS |
| 27.60 | 4BS |
| 28.70 | 4BS |
| 29.20 | 4BS |
| 31.00 | 4BS |
| 33.60 | 4BS |
| 46.00 | 4BS |
| 46.50 | 4BS |

Figure 2:
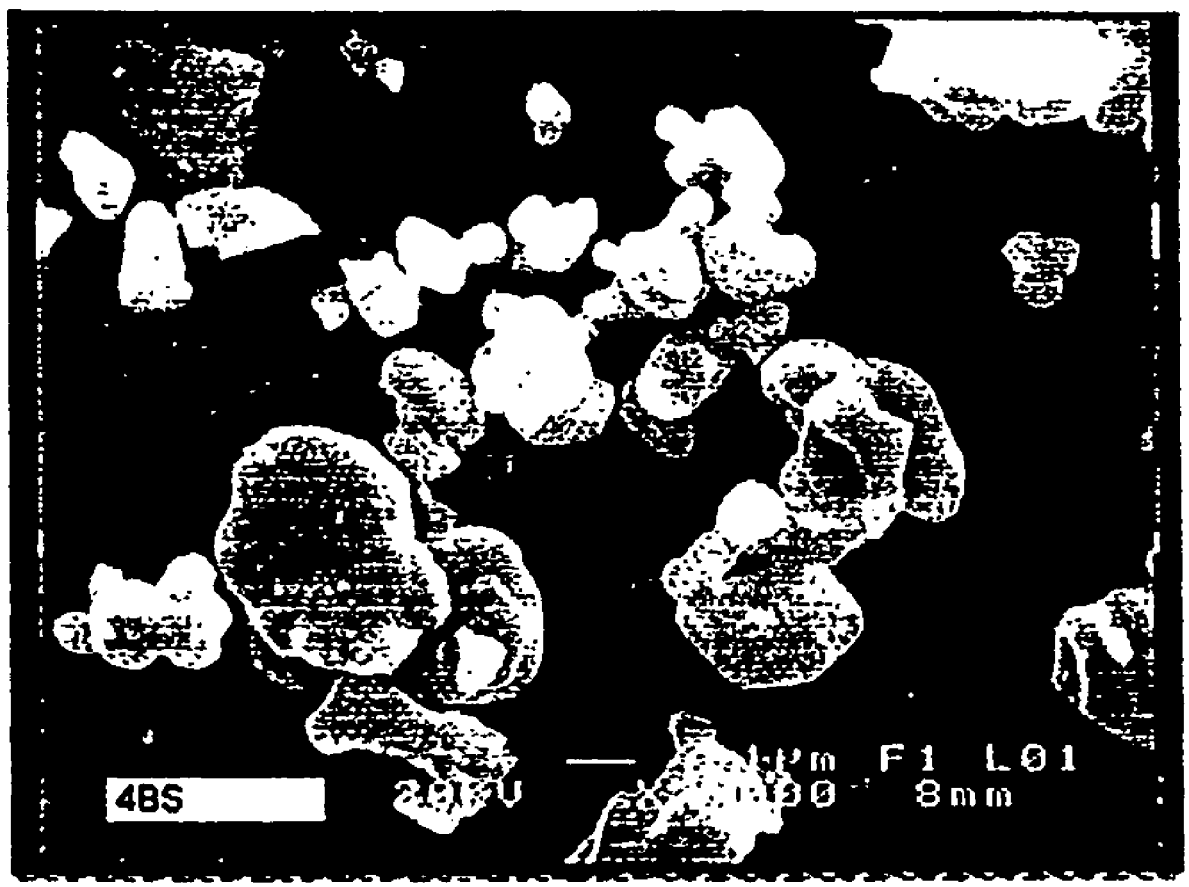
FIG. 2 shows a characteristic scanning electron microscopy micrograph of the tetrabasic lead sulfate obtained by a solid state reaction according to the present invention.

The morphology and size of the particles obtained according to the present invention can be observed in FIG. 2. Procedures indicated in the present invention allow to obtain particles of tetrabasic lead sulfate having a size of less than 10 μm, avoiding any further milling of the material and requiring only the employment of a dispersion process, which can be carried out either under dry conditions or in a liquid suspension.

The production of tetrabasic lead sulfate by using a wet procedure involves the formation of tribasic lead sulfate intermediate compound, which must be transformed later into tetrabasic lead sulfate by means of a suitable heat treatment. In contrast, in the methods which are claimed in the present invention, the chemical reaction that takes place between lead oxide and different sulfated compounds occurs in a single high temperature treatment.

The procedures indicated in the present application allow to obtain particles of tetrabasic lead sulfate having a size of less than 10 μm, avoiding any further milling of the material and requiring only the employment of a dispersion process, which can be carried out either under dry conditions or in a liquid suspension.

In the methods which are claimed, the chemical reaction that takes place between lead oxide and different sulfated compounds occurs in a single high temperature treatment.

Tetrabasic lead sulfate obtained according to the methods of the present invention can be used for the production of lead-acid battery pastes, the production of lead-acid battery plates made with said pastes, and the production of lead-acid batteries subsequently made with them.

What is claimed is:

1. A solid state reaction method for the production of tetrabasic lead sulfate comprising the steps of:
    mixing a stoichiometric mixture of $3PbO.PbSO_4.H_2O$ and PbO;
    heating the stoichiometric mixture of $3PbO.PbSO_4.H_2O$ and PbO at a temperature between 500 and 700° C. for 3 to 8 hours; and
    deagglomerating and sieving resulting tetrabasic lead sulfate.

2. The solid state reaction method of claim 1 further comprising obtaining the mixture of $3PbO.PbSO_4.H_2O$ and PbO from the group consisting of active materials for pastes used for preparation of lead-acid battery plates, recycled lead-acid battery plates, and combinations thereof.

3. The solid state reaction method of claim 1 wherein the step of heating the stoichiometric mixture of $3PbO.PbSO_4.H_2O$ and PbO is performed at a temperature of 600° C.

4. The solid state reaction method of claim 3 wherein the step of heating the stoichiometric mixture of $3PbO.PbSO_4.H_2O$ and PbO is performed for 4 hours.

5. The solid state reaction method of claim 1 wherein the tetrabasic lead sulfate has a particle size of less than 10 μm.

6. The solid state reaction method of claim 1 wherein the step of deagglomerating and sieving is a dispersion process.

7. The solid state reaction method of claim 6 wherein the dispersion process is carried out under dry conditions.

8. The solid state reaction method of claim 6 wherein the dispersion process is carried out in a liquid suspension.

9. A method of forming a battery plate comprising:
    mixing a stoichiometric mixture of $3PbO.PbSO_4.H_2O$ and PbO;
    heating the stoichiometric mixture of $3PbO.PbSO_4.H_2O$ and PbO at a temperature between 500 and 700° C. for 3 to 8 hours; and
    deagglomerating and sieving resulting tetrabasic lead sulfate;
    forming a paste using the tetrabasic lead sulfate; and
    providing the paste on a battery plate.

10. The method of claim 9 wherein the step of heating the stoichiometric mixture of $3PbO.PbSO_4.H_2O$ and PbO is performed at a temperature of 600° C.

11. The method of claim 10 wherein the step of heating the stoichiometric mixture of $3PbO.PbSO_4.H_2O$ and PbO is performed for 4 hours.

12. The method of claim 9 wherein the tetrabasic lead sulfate has a particle size of less than 10 μm.

13. The method of claim 9 wherein the step of deagglomerating and sieving is a dispersion process.

14. The method of claim 13 wherein the dispersion process is carried out under dry conditions.

15. The method of claim 13 wherein the dispersion process is carried out in a liquid suspension.

16. A method of producing a lead-acid battery comprising:
    providing a battery comprising a plurality of battery plates, the battery plates prepared by a method comprising:
        mixing a stoichiometric mixture of $3PbO.PbSO_4.H_2O$ and PbO;
        heating the stoichiometric mixture of $3PbO.PbSO_4.H_2O$ and PbO at a temperature between 500 and 700° C. for 3 to 8 hours;
        deagglomerating and sieving resulting tetrabasic lead sulfate;
        forming a paste using the tetrabasic lead sulfate; and
        providing the paste on a battery plate.

17. The method of claim 16 wherein the step of heating the stoichiometric mixture of $3PbO.PbSO_4.H_2O$ and PbO is performed at a temperature of 600° C.

18. The method of claim 17 wherein the step of heating the stoichiometric mixture of $3PbO.PbSO_4.H_2O$ and PbO is performed for 4 hours.

19. The method of claim 16 wherein the tetrabasic lead sulfate has a particle size of less than 10 μm.

20. The method of claim 16 wherein the step of deagglomerating and sieving is a dispersion process.

* * * * *